(12) United States Patent
Fujimori (10) Patent No.: US 8,274,692 B2
(45) Date of Patent: Sep. 25, 2012

(54) PRINT CONTROLLING METHOD AND PRINT CONTROLLING DEVICE

(75) Inventor: Nobuyuki Fujimori, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1003 days.

(21) Appl. No.: 11/499,135

(22) Filed: Aug. 3, 2006

(65) Prior Publication Data

US 2007/0035759 A1 Feb. 15, 2007

(30) Foreign Application Priority Data

Aug. 3, 2005 (JP) ............................ P2005-225258
Jun. 21, 2006 (JP) ............................ P2006-171441

(51) Int. Cl.
*G06K 15/00* (2006.01)

(52) U.S. Cl. ............ 358/1.18; 358/1.9; 399/82; 399/85; 399/383

(58) Field of Classification Search ............... 358/1.13, 358/1.15

See application file for complete search history.

(56) References Cited

U.S. PATENT DOCUMENTS

| | | | |
|---|---|---|---|
| 6,724,502 B1 | 4/2004 | Miyake et al. | |
| 2002/0051136 A1* | 5/2002 | Kawamura et al. | 358/1.1 |
| 2004/0169727 A1* | 9/2004 | Romano et al. | 348/207.2 |
| 2005/0185205 A1* | 8/2005 | Eckhaus et al. | 358/1.13 |
| 2006/0126108 A1* | 6/2006 | Ahmed et al. | 358/1.15 |
| 2007/0035759 A1* | 2/2007 | Fujimori | 358/1.13 |
| 2007/0214295 A1* | 9/2007 | Tanizawa et al. | 710/62 |

FOREIGN PATENT DOCUMENTS

| | | |
|---|---|---|
| JP | 10-126724 | 5/1998 |
| JP | 10-200839 | 7/1998 |
| JP | 2000-244852 | 9/2000 |
| JP | 2000-244855 | 9/2000 |
| JP | 2001045339 A | 2/2001 |
| JP | 2002059611 | 2/2002 |
| JP | 2002059624 A | 2/2002 |
| JP | 2003076772 A | 3/2003 |
| JP | 2003078848 A | 3/2003 |
| JP | 2005103822 | 4/2005 |

* cited by examiner

*Primary Examiner* — Benny Q Tieu
*Assistant Examiner* — Marcellus Augustin
(74) *Attorney, Agent, or Firm* — Nutter McClennen & Fish LLP; John J. Penny, Jr.; Michael P. Visconti, III (57) ABSTRACT

In order to control printing of at least one of a plurality of digital images, zero or no value is set as a default value for a number of print copy of every one of the digital images. If any, an instruction for setting the number of print copy of at least one of the digital images is received. An instruction for printing the at least one of the digital images is received, under a condition that an identifier associated with one of the digital images is designated in a display. It is judged whether the at least one of the digital images includes at least one digital image to which one or more is set as the number of print copy, upon receipt of the instruction for printing. The at least one of the digital images is printed in accordance with the set number of print copy when it is judged the at least one of the digital images includes at least one digital image to which one or more is set as the number of print copy. One copy of the one of the digital images associated with the designated identifier is printed when it is judged the at least one of the digital images does not include at least one digital image to which one or more is set as the number of print copy.

12 Claims, 6 Drawing Sheets

| PATH | NUMBER OF COPY |
|---|---|
| Removable Memory ¥DCIM¥Maker¥001.jpg | 0 |
| Removable Memory ¥DCIM¥Maker¥002.jpg | 0 |
| Removable Memory ¥DCIM¥Maker¥003.jpg | 0 |
| Removable Memory ¥DCIM¥Maker¥004.jpg | 0 |
| Removable Memory ¥DCIM¥Maker¥005.jpg | 0 |
| Removable Memory ¥DCIM¥Maker¥006.jpg | 0 |
| Removable Memory ¥DCIM¥Maker¥007.jpg | 0 |
| Removable Memory ¥DCIM¥Maker¥008.jpg | 0 |
| Removable Memory ¥DCIM¥Maker¥009.jpg | 0 |
| Removable Memory ¥DCIM¥Maker¥010.jpg | 0 |

FIG. 8

PRINT CONTROLLING METHOD AND PRINT CONTROLLING DEVICE

BACKGROUND OF THE INVENTION

The present invention relates to a print controlling method and a print controlling device.

A so-called standalone printer capable of reading digital images from a removable memory which can perform individual printing without being controlled by a personal computer or the like is known. In the standalone printer, batch printing is known. According to batch printing, setting of the number of print copy is individually received for every digital image by sequentially displaying digital images stored in the removable memory on a display possessed by the standalone printer, and when printing is instructed, the digital images, whose number of print copy is set, are printed in a batch according to the number of print copy which is set for each print image.

Meanwhile, in the above-mentioned batch printing, it is inconvenient when a default value which is equal to or greater than '1' is set to the number of print copy of digital images. This is because a default value may be set for a digital image not desired to be printed, so that a user should perform the operation of resetting the number of print copy not desired to be printed to '0'.

Further, there is a case when a user displays digital images sequentially, but only wants to print the image being displayed. In this case, if a default value is not set to the number of print copy, if a user wants to print only the digital image which is being displayed, the operation of setting the number of print copy should be performed even. Accordingly, to print the displayed image, the digital image must be displayed individually, resulting in additional operations, which is inconvenient.

SUMMARY OF THE INVENTION

It is therefore an object of the invention to provide a print controlling device and a print controlling method, capable of performing individual printing by a simple operation when a default value is not set for the number of print copy or '0' is set as the default value so that the number of print copy of digital images not desired during batch printing.

In order to achieve the above object, according to the invention, there is provided a method of controlling printing of at least one of a plurality of digital images, comprising:

setting zero or no value as a default value for a number of print copy of every one of the digital images;

receiving an instruction for setting the number of print copy of at least one of the digital images, if any;

receiving an instruction for printing the at least one of the digital images, under a condition that an identifier associated with one of the digital images is designated in a display;

judging whether the at least one of the digital images includes at least one digital image to which one or more is set as the number of print copy, upon receipt of the instruction for printing;

printing the at least one of the digital images in accordance with the set number of print copy when it is judged the at least one of the digital images includes at least one digital image to which one or more is set as the number of print copy; and printing one copy of the one of the digital images associated with the designated identifier when it is judged the at least one of the digital images does not include at least one digital image to which one or more is set as the number of print copy.

With this configuration, a user can omit the operation of setting the number of print copy when a digital image is individually printed. Thus, the individual printing can be performed by a simple operation while preventing the number of print copy from being set to the digital images not desired to be printed.

The method may further comprise:

displaying the set number of print copy together with the identifier in a case where the instruction for setting is received; and displaying zero together with the identifier in a case where the instruction for setting is not received.

In this case, a user is able to easily confirm the set number of print copy when the set number of print copy is displayed. Further, a user can easily recognize that the number of print copy is not set for a digital image which is being displayed.

The method may further comprise acquiring the identifier from a storage in which data of the digital images are stored. The storage may be a removable disk.

The method may further comprise:

establishing a batch printing mode in which the same number of print copy of all of the digital images are printed in a batch;

setting manually the number of print copy of one of the digital images; and setting automatically the number of print copy of every one of the others of the digital images as same as the number of print copy manually set.

In this case, the number of operations by a user can be reduced when all the digital images are printed with the same number for print copies.

The identifier may be a downsized image of associated one of the digital images.

In this case, a user can easily recognize the content of the digital image of interest.

According to the invention, there is also provided a device for controlling printing of at least one of a plurality of digital images, which is incorporated in an apparatus provided with a display adapted to display at least one of the digital images simultaneously, comprising:

a first instruction receiver, adapted to receive an instruction for setting a number of print copy of at least one of the digital images;

a second instruction receiver, adapted to receive an instruction for printing the at least one of the digital images, under a condition that an identifier associated with one of the digital images is designated in the display;

a judge, operable to judge whether the at least one of the digital images includes at least one digital image to which one or more is set as the number of print copy, when the second instruction receiver receives the instruction for printing;

a controller, operable to print the at least one of the digital images in accordance with the set number of print copy when the judge judges that the at least one of the digital images includes at least one digital image to which one or more is set as the number of print copy, and to print one copy of the one of the digital image associated with the designated identifier when it is judged the at least one of the digital images does not include at least one digital image to which one or more is set as the number of print copy, wherein:

zero or no value is set as a default value for the number of print copy of every one of the digital images.

Here, each function of the above claimed elements may be realized by a hardware resource whose configuration itself is specified, a software resource whose configuration is specified by a program, and a combination thereof. Further, each function of the above claimed elements may not be limited to one which is realized by the hardware resources being physically independent from each other.

According to the invention, there is also provided a printer, comprising:

a printing unit, operable to print information on a printing medium;

a display, adapted to display at least one of digital images simultaneously; and the above print controlling device, wherein:

the controller is operable to cause the printing unit to print the at least one of the digital images on the printing medium.

According to the invention, there is also provided a digital camera, adapted to be communicatively connected to a printer provided with a printing unit operable to print information on a printing medium, the digital camera comprising:

an image capturer, adapted to capture an image of an object and operable to generate a digital image;

a display, adapted to display at least one digital images simultaneously; and the above print controlling device, wherein:

the controller is operable to cause the printing unit to print the at least one of the digital images on the printing medium.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Embodiments of the invention will be described below in detail with reference to the accompanying drawings.

Figure 2:
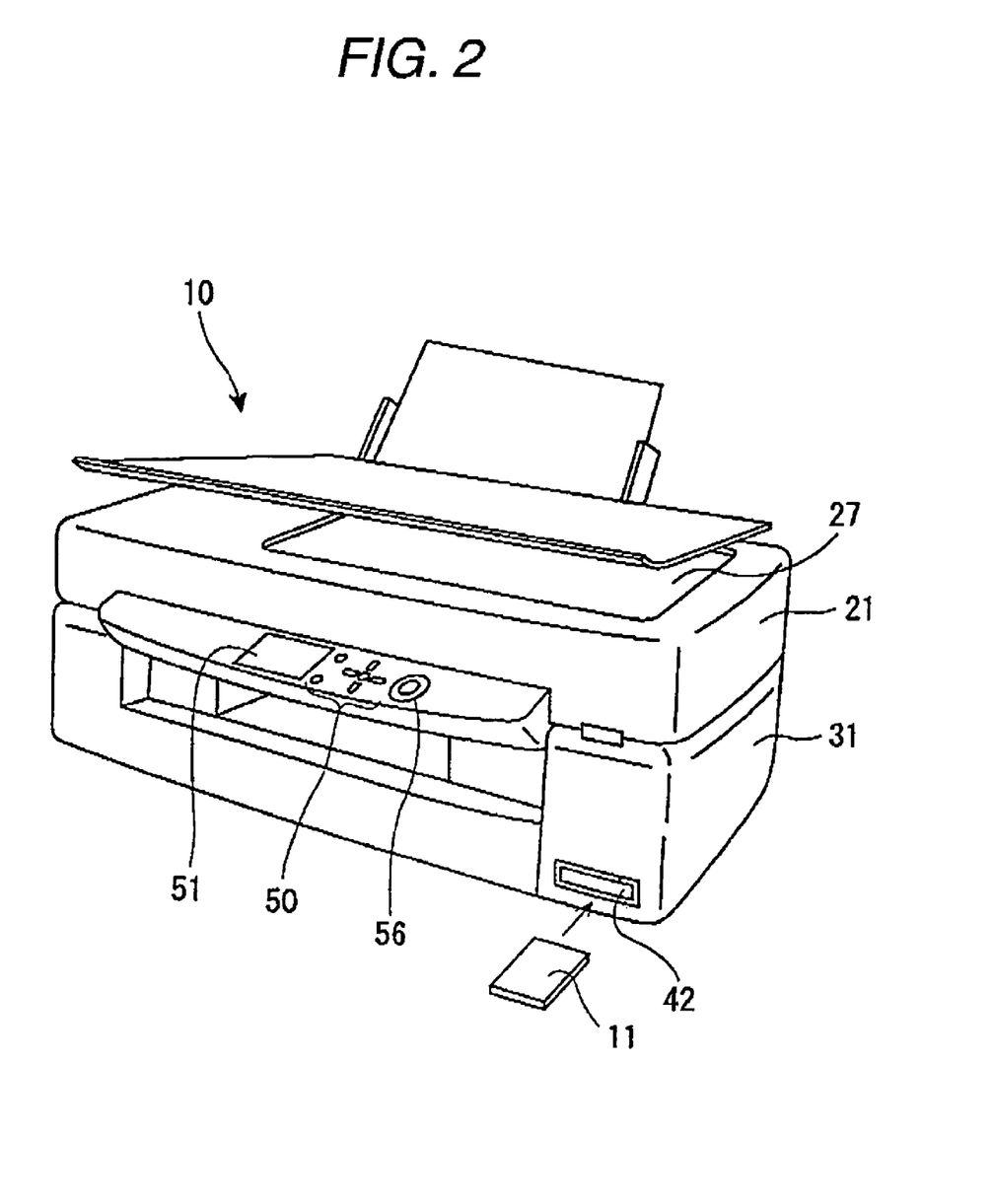
FIG. 2 is a perspective view showing an external appearance of a printer in which the print controlling method is executed.
Figure 3:
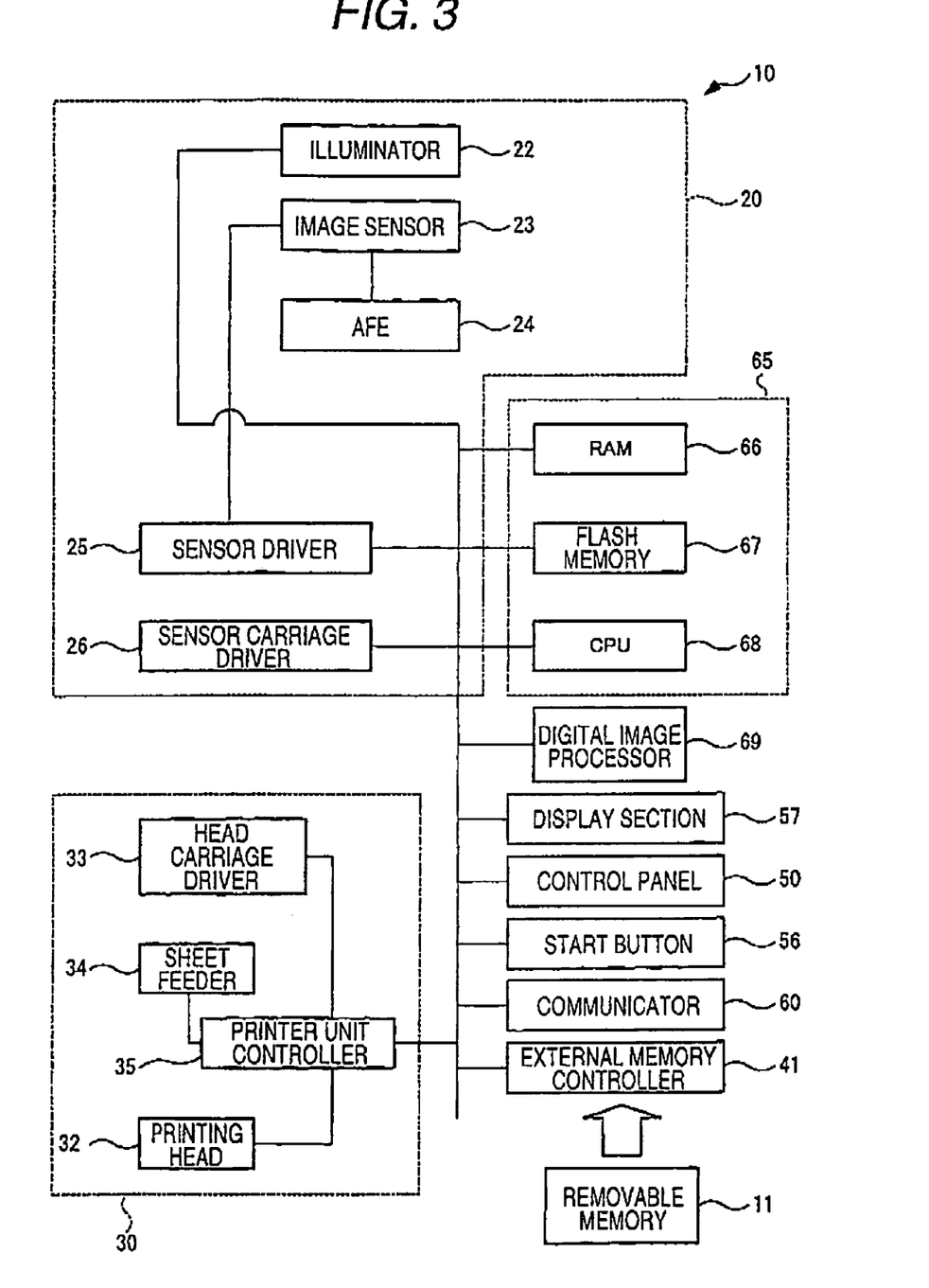
FIG. 3 is a block diagram showing a hardware configuration of the printer.

As shown in FIGS. 2 and 3, a hybrid machine 10 according to one embodiment of the invention comprises a print controlling device including a display section 57, a control panel 50, a start button 56, a controller 65, a scanner unit 20 which reads an original to create a digital image and outputs the created digital image to a removable memory 11 or a personal computer (PC) (not shown), and a printer unit 30 which prints a digital image input from the removable memory 11 or PC.

The scanner unit 20 is mainly accommodated within an upper casing 21, and includes an illuminator 22, an image sensor 23, an AFE (Analog Front End) 24, a sensor driver 25, a sensor carriage driver 26, and so on. The illuminator 22 is composed of a fluorescent tube lamp extending in a first direction. The image sensor 23 to be driven by the sensor driver 25 is a linear image sensor, such as a color CCD linear image sensor, including a fluorescent element group of three channels of RGB. The image sensor 23 includes the sensor carriage which moves parallel to a transparent scanning table 27. The image sensor 23 outputs electrical signals in correspondence with the density of an optical image of an original which is focused on a light-receiving face by lenses and mirrors (not shown). The sensor carriage driver 26 includes a motor, a driving belt, a driving circuit, and so on, which are not shown. The sensor carriage driver 26 reciprocally moves a sensor carriage along a guide rod (not shown) extending in a second direction perpendicular to the first direction. The image sensor 23 is able to read a two-dimensional image while it moves in the second direction. The AFE 24 includes an analog signal processing circuit for amplification, noise removal, or the like, an A/D converter, and so on.

The printer unit 30 is mainly accommodated within a lower casing 31, and includes a printing head 32 for forming an image on a sheet by using an ink jet printing technique, a head carriage driver 33, a sheet feeder 34, and a printer unit controller 35 which controls these parts. In addition, the printer unit 30 may have any configuration as long as it is compatible with other printing methods, such as a laser printing technique. The printing head 32 is mounted on a head carriage (not shown) which carries an ink cartridge, and includes nozzles, piezoelectric elements, a piezoelectric driving circuit which applies driving signals to the piezoelectric elements, and so on. The piezoelectric driving circuit applies a predetermined driving signal to the piezoelectric elements in response to control signals output from the printer unit controller 35. The head carriage driver 33 includes a motor, a driving belt, a motor-driving circuit, and so on, which are not shown. The head carriage driver 33 reciprocally moves the printing head 32 vertically to a conveying direction of a sheet. The sheet feeder 34 includes a sheet feeding roller, a motor, a motor-driving circuit, and so on, which are not shown. The sheet feeder 34 rotates a sheet feeding roller to convey a sheet in a direction perpendicular to an axis along a direction in which the printing head 32 moves. The printing head controller 35 is an ASIC including a buffer memory to which print data is sequentially transmitted from a RAM 66. The printing head controller 35 has a function to control the timing at which the print data stored in the buffer memory is output to the printing head 32 according to the position of the head carriage, a function which controls the head carriage driver 33, and a function which controls the sheet feeder 34.

An external memory controller 41 is connected to the removable memory 11 that is inserted through a card slot 42. The data stored in the removable memory 11 is read out by the external memory controller 41 and transmitted to the RAM 66. The removable memory 11 is a nonvolatile memory, such as a flash memory, in which stored contents are held even if power is not supplied.

Figure 8:
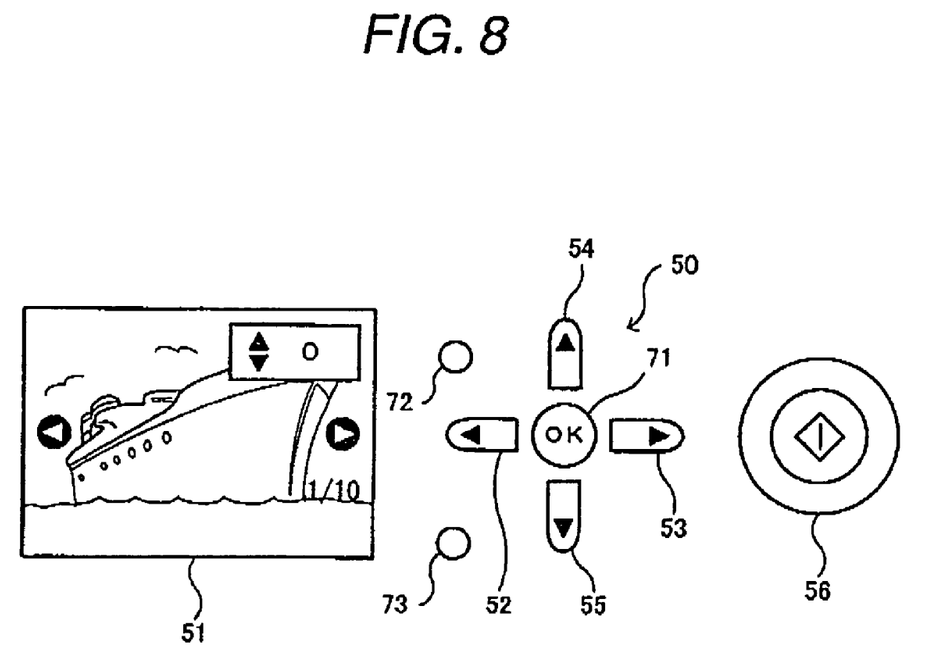
FIG. 8 is a schematic view of an LCD, a control panel, and a start button of the printer.

The display section 57 includes an LCD 51 which can display a digital image, and a graphic controller (not shown), which controls the LCD 51. The display section 57 is controlled by the controller 65 to display a digital image and a variety of menu items on the LCD 51. The control panel 50, as shown in FIG. 8, includes various buttons, such as a left button 52, a right button 53, an upper button 54, a lower button 55, an 'OK' button 71, a 'Print Setting' button 72, and a 'Back' button 73. The left button 52 and the right button 53 are buttons which allows a user to select a digital image. The upper button 54 and the lower button 55 are buttons which allow a user to set the number of print copy of a displayed image. In addition, the control panel 50 may be embodied by a touch panel, a pointing device, and so on. Further, the control panel 50 also includes a mode selection button (not shown) for selecting an individual printing mode or a batch printing mode. The individual printing mode is a mode in which setting of the number of print copy is individually received for each digital image, and digital images whose number of print copy is set are printed in a batch by the number of print copy which is set individually. The batch printing mode is a mode in which the same number of print copy is set as a batch for all digital images, and all the digital images are printed in a batch corresponding to the number of print copy which is set in a batch.

The start button 56 (see FIG. 8) allows a user to instruct printing. A communicator 60 shown in FIG. 3 is a communicating interface which allows the controller 65 to communicate with an external system such as a PC. The communicator 60 communicates with an external system through a LAN, Internet, a USB, or the like.

The controller 65 includes the RAM 66, a flash memory 67 and a CPU 68. The CPU 68 executes a control program stored in the flash memory 67 to control each part of the hybrid machine 10. Further, the controller 65 executes a print controlling program stored in the flash memory 67. The flash memory 67 is a nonvolatile memory which stores a print controlling program or the like. The RAM 66 is a volatile memory in which a print controlling program, the number of print copy set for each image, and various kinds of data, such as a digital image created by the scanner unit 20 are temporarily stored. The print controlling program may be stored in the flash memory 67 via a network from a remote server or may be stored in the flash memory 67 by using a computer-readable recording medium, such as a removable memory 11.

A digital image processor 69 is a dedicated circuit, such as a DSP (Digital Signal Processor), which executes various kinds of image processing, such as decoding of a JPEG-type digital image, unsharping, resolution converting, binarization, and plate-dividing processing, in cooperation with the CPU 68.

Figure 4:
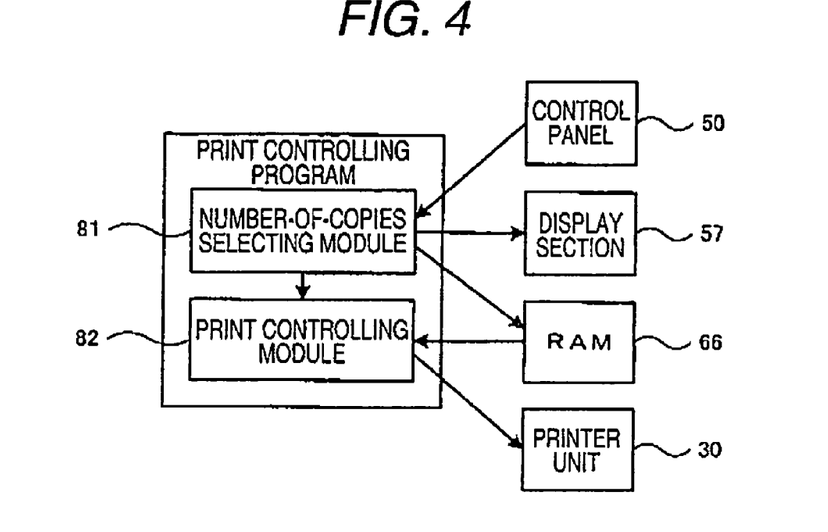
FIG. 4 is a block diagram showing a logical configuration of a print controlling program executed in the printer.

As shown in FIG. 4, the print controlling program comprises a number-of-copies setting module 81, and a print controlling module 82.

Figure 5:
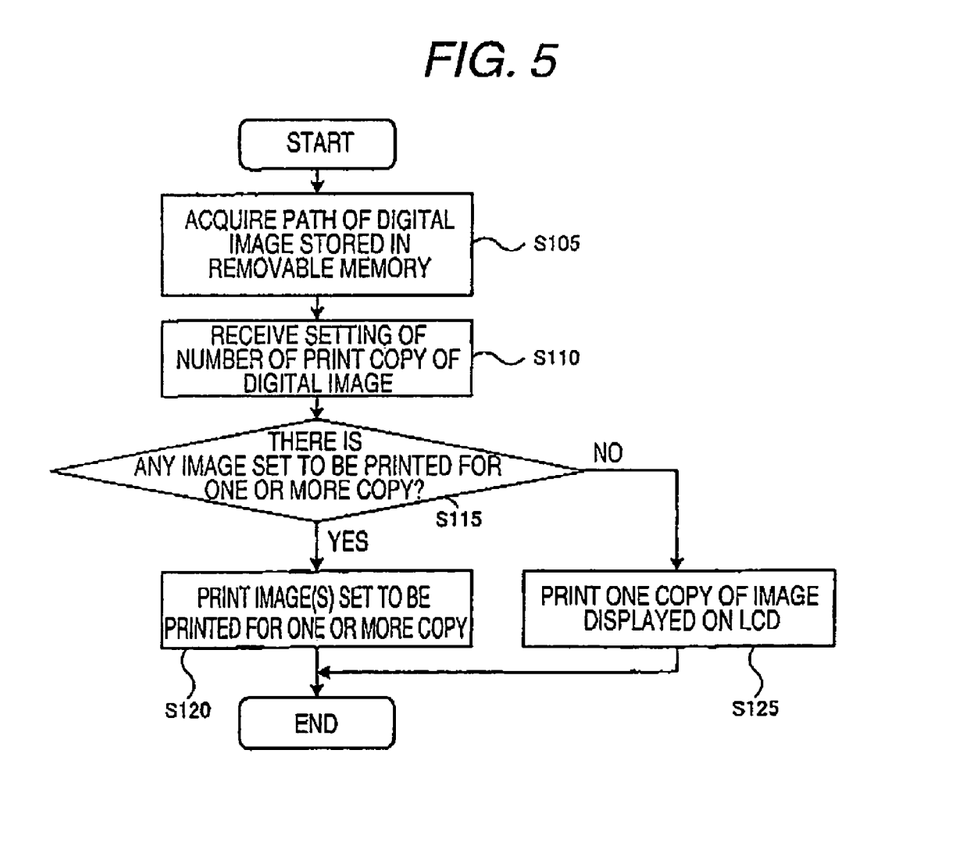
FIG. 5 is a flowchart showing operations of a controller in the printer when the print controlling program is executed.
Figure 6:
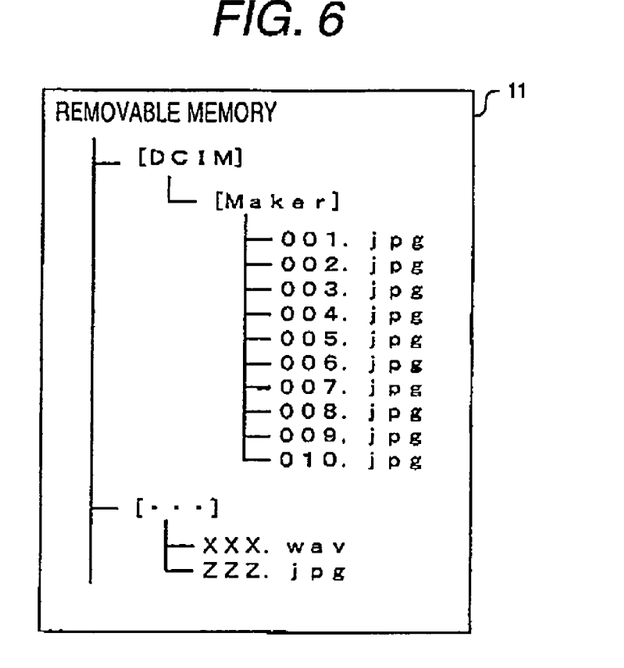
FIG. 6 is a schematic view showing an example of data stored in a removable memory.

Next, the operation of the controller 65 which executes the print controlling program will be described. FIG. 5 is a flowchart showing the flow processing of the controller 65 when an individual printing mode is selected. The processing is started when a user operates the control panel 50 to select the individual printing mode. In Step S105, the controller 65 retrieves the data within the removable memory 11 to acquire paths of all the digital images stored in a predetermined format of file. In addition, although a removable memory such as a 'predetermined recording medium' set forth in the claims is illustrated in the present embodiment, the 'predetermined recording medium' may be, for example, a built-in hard disk or a hard disk of a server connected to a network. The 'predetermined recording medium' may be selected in advance, or may be selected by a user. Further, the controller 65 may acquire only paths of all the digital images stored in a specific directory of a recording medium. In this case, the specific directory of a recording medium corresponds to the 'predetermined recording medium' set forth in the claims. The controller 65 acquires paths of files whose extension is '.jpg' or '.exif'. Next, the controller 65 creates a table (refer to FIG. 7), in which the acquired paths are in correspondence with the numbers of copies, in the RAM 66. In addition, although a case in which the number of print copy of each digital image is managed the table is illustrated herein, how the controller 66 internally manages the number of print copy of each digital image is selected in respect to the machine. FIG. 6 schematically shows an example of the data stored in the removable memory 11.

Figure 7:
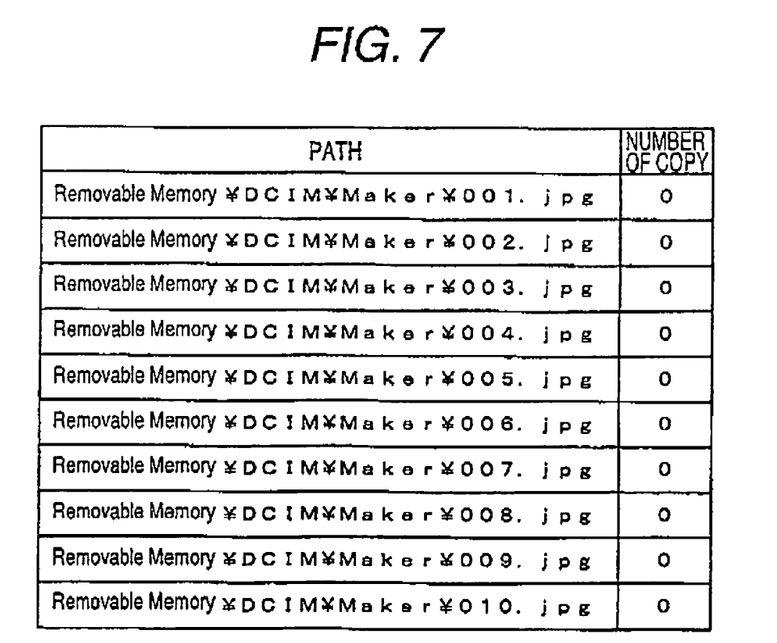
FIG. 7 is a schematic view of a table created by acquiring paths of digital image data stored in the removable memory.

FIG. 7 schematically shows a table created by acquiring the paths from the removable memory 11. In this condition, the controller 65 sets all default values of the numbers of copies to '0' (zero). If the default values are set to 1, even the default value of a digital image not desired to be printed may be set to '1'. In this case, since a user should change the number of print copy of the digital image, not desired to be printed, to '0', but the operation becomes laborious if the number of digital images is large. When a digital image is printed individually, since the numbers of copies of the other digital images should be reset to '0', the operation becomes particularly laborious. In the present embodiment, based on the assumption that the digital images are to be individually printed, the default values of the digital images to '0'.

In addition, although a case in which '0' is set as the default values in a table, at a stage at which paths are acquired from a removable memory, is illustrated in the present embodiment, the timing that '0' is set is not limited thereto. For example, '0' may be set at a stage immediately before the display of digital images. Further, '0' may not be set in the table even immediately before the display of digital images, but '0' may be displayed on the LCD 51 only (refer to FIG. 8), and if the number of print copy of digital images is set to '1' or higher, this number of print copy may be stored in the table. In this case, no matter what stages, '0' will not be stored in the table. In addition, a state in which the number of print copy is applied as long as a user does not perform the operation of intentionally changing the number of print copy of digital images is called a state in which the number of print copy is set, and 'setting' indicates the state in which the number of print copy is set. For example, as described above, the state in which the number of print copy is displayed on the LCD 51 is the state in which the number of print copy is applied as long as a user does not intentionally change it. Thus, for example, even if the number of print copy is not stored in a table, it can be said that this is a state in which the number of print copy is set. Further, although the case in which '0' is set as a default value is illustrated herein, it can be regarded that '0' is set as the default value if any value is not set. Thus, no value may be set as the default value.

In Step S110, the controller 65 executes the number-of-copies setting module 81 and receives setting of the number of print copy of digital images. Specifically, the controller 65 receives a selection by sequentially displaying downsized images of digital images one by one on the LCD 51 according to operation of the control panel 50 controlled by a user and receives the setting of the number of print copy of the selected digital image. In a case where the LCD 51 is adapted to display a plurality of downsized images (e.g., 9 images) simultaneously, a plurality of sets of the downsized image may be sequentially displayed. Hereinafter, the operation in which a user sets the number of print copy will be described with reference to FIG. 8.

The controller 65 selects one path sequentially from a table, and displays a downsized image of a digital image specified by the selected path on the LCD 51. The thumbnail image may be a display image created from a digital image in accordance with the display resolution of the LCD 51. Otherwise, when a digital image is stored in the format file, in which a thumbnail image can be stored like an EXIF file, the thumbnail image may be a thumbnail image stored in the file. When a thumbnail image of a digital image is displayed, a user can select the digital image while confirming the contents of the digital image to be printed. Thus, the selection of a digital image becomes easy. Further, if one image is displayed at a time on the LCD 51, the image will be largely displayed as compared to a case in which a plurality of digital images is displayed at one time. Thus, even if a display region of the LCD 51 is narrow, the digital image can be confirmed easily.

In addition, the identification information may be arbitrary information, for example, the filename, path, and frame number of a digital image as long as the digital image is uniquely identifiable.

Further, as shown in the figure, the controller 65 displays the number of print copy in correspondence with a selected path at the upper right of the LCD 51. In a case of a digital image for which '0' is set as the number of print copy or no value is set as the number of print copy, '0' will be displayed. If '0' is displayed, a user can easily comprehend that the number of print copy of a displayed digital image is not set. In addition, if the number of print copy is '0', '-' may be displayed or nothing may be displayed. This is because, if nothing is displayed, it can be determined that the number of print copy is '0'. Further, as shown in the figure, the controller 65 displays a figure indicating the number of digital images stored in the removable memory 11, and a frame number indicating what number a digital image is the digital image which is currently displayed is displayed at the lower right of the LCD 51. For example, '1/10' in the illustrated example indicates that the number of all the digital images stored in the removable memory 11 is ten and the first-frame digital image of the digital images is displayed.

Selection of a digital image is performed by pushing the left button 52 and the right button 53. If the left button 52 is pushed one time, the controller 65 displays on the LCD 51 a downsized image of a digital image previous to an image which is currently displayed. Similarly, when the right button 53 is pushed one time, the controller 65 displays a downsized image of a next digital image on the LCD 51.

Setting of the number of print copy is performed by pushing the upper button 54 and the lower button 55 in a state where a downsized image of a target digital image is displayed on the LCD 51. When the upper button 54 is pushed one time, the controller 65 adds '1' to the displayed number of print copy, and displays the number of print copy, after '1' is added, on the LCD 51. The controller also updates the number of print copy stored in a table in association with a path of a digital image corresponding to the downsized image, to the number of print copy after '1' is added. In addition, the timing that the table is updated may be the timing that the left button 52 or the right button 53 is pushed. Similarly, when the lower button 55 is pushed one time, the controller 65 subtracts '1' from the displayed number of print copy, and displays the number of print copy after '1' is subtracted on the LCD 51. The controller also updates the number of print copy stored in a table, to the number of print copy after '1' is subtracted.

In addition, when the number of print copy is '1', '1' is not displayed as the number of print copy on the LCD 1, but a checkmark having an arbitrary shape, such as 'V', may be displayed. This is because, when the checkmark is displayed, a user can comprehend that the set number of print copy is '1'.

A user pushes the above-mentioned right, left, upper or lower button to set a desired number of print copy for a desired digital image, and pushes the start button to instruct the printer unit to perform batch printing. At Step S115, when the start button 56 is pushed, the controller 65 executes the print controlling module 82, and determines whether or not there is a digital image whose number of print copy is set to '1' or higher, including a digital image corresponding to a downsized image which is currently displayed. If there is a digital image whose number of print copy is set to '1' or higher, the controller 65 proceeds to Step S120, or if not, the controller proceeds to Step S125.

At Step S120, the controller 65 controls the printer unit 30 to sequentially print all the digital images whose number of print copy is set to '1' or higher by the number of print copy which is set for each digital image, At Step S125, the controller 65 controls the printer unit 30 to print one copy of a digital image corresponding to a downsized image which is currently displayed on the LCD 51.

Figure 1A:
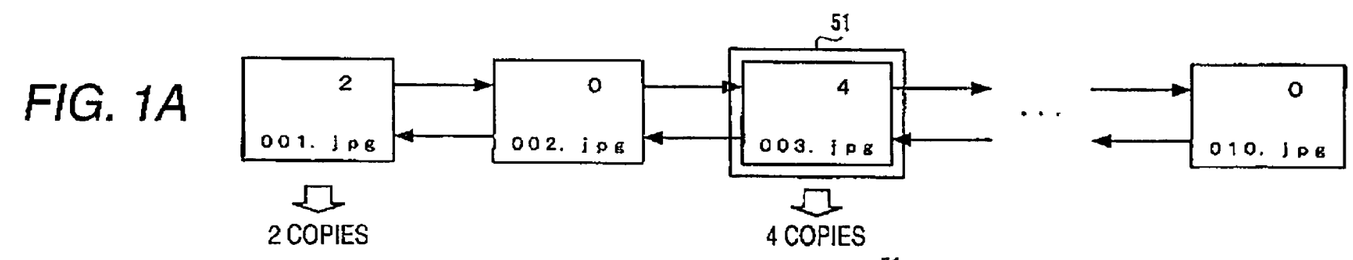
FIGS. 1A to 1C are diagrams for explaining a print controlling method according to one embodiment of the invention.

Hereinafter, the above-described steps from Step S115 to Step S125 will be described on the basis of a specific example shown in FIGS. 1A to 1C. FIG. 1A shows that paths of ten digital images of '001.jpg' to '010.jpg' are acquired from the removable memory 11, and a user sets '2' as the number of print copy for '001.jpg', and sets '4' as the number of print copy for '003.jpg'. FIG. 1A also shows that a downsized image of '003.jpg' is currently displayed on the LCD 51. As an example shown in FIG. 1A, when the start button 56 is pushed, two copies of '001.jpg' and four copies of '003.jpg' will be printed.

Figure 1B:
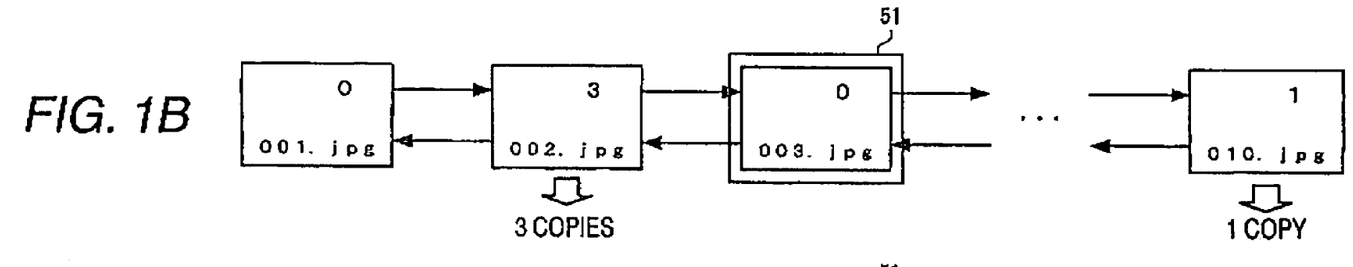

Similarly, FIG. 1B shows that paths of ten digital images of '001.jpg' to '010.jpg' are acquired from the removable memory 11, and a user sets '3' as the number of print copy for '002.jpg', and sets '1' as the number of print copy for '010.jpg'. FIG. 1B also shows that a downsized image of '003.jpg' is currently displayed on the LCD 51, and the number of print copy of '003.jpg' remains '0'. In this case, if the start button 56 is pushed, three copies of '002.jpg' and one copy of '010.jpg' will be printed. A downsized image of '003.jpg' is displayed on the LCD 51, but '003.jpg' itself will not be printed.

Figure 1C:
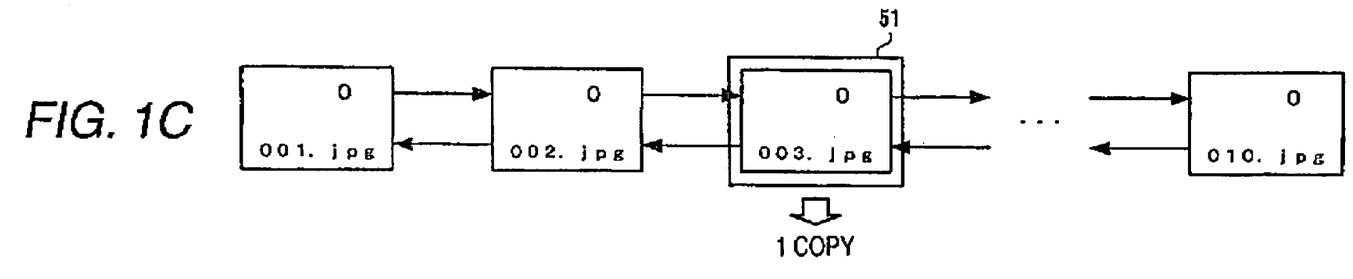

Similarly, FIG. 1C shows that paths of ten digital images of '001.jpg' to '010.jpg' are acquired from the removable memory 11, and the number of print copy is not set for any one of the digital images. FIG. 1C also shows that a downsized image of '003.jpg' is currently displayed on the LCD 51. As an example shown in FIG. 1C, when the start button 56 is pushed, one copy of '003.jpg' will be printed regardless of that the displayed number of print copy is '0'. In a case where a plurality of downsized images are simultaneously displayed on the displayed LCD 51, and the number of print copy is not set for any one of the digital images, images corresponding to the plural downsized images which are being displayed will be printed one by one.

In these figure, the arrows directed rightward represent that a displayed image is changed in accordance with the depression of the right button 53. Similarly, the arrows directed leftward represent that a displayed image is changed in accordance with the depression of the left button 52.

Next, the processing of the controller 65 when the batch printing mode is selected will be described. The processing when the batch printing mode is selected is substantially the same as the individual printing mode except that the same number for print copies is set as a batch for all digital images. When the upper button 54 is pushed one time in the batch printing mode, the controller 65 adds '1' to the number of print copy of all the digital images. Similarly, when the lower button 55 is pushed one time, the controller 65 subtracts '1' from the number of print copy of all the digital images.

In the present embodiment, no default value is set to the number of print copy of digital images or setting of the number of print copy is received by setting '0' as the default values. Thus, when a user wants to print a predetermined copy, for example, one copy of all the digital images, '1' should be set as the number of print copy for all the digital images. In this case, when the number of print copy is set individually for each digital image, this takes time or effort. When the batch printing mode is selected, a user is able to set the same number of print copy in a batch for all the digital images. Thus, a user can efficiently reduce the time when all the digital images are printed one by one.

In the hybrid machine 10 described above, when the number of print copy that is equal to or greater than '1' is set for one or more digital images, when the start button 56 is pushed, as shown in FIG. 1A or 1B, one or more digital images can be sequentially printed by the number of print copy set for each digital image. On the other hand, when the number of print copy that is equal to or greater than '1' is not set for any digital images including a digital image which is currently displayed, the start button 56 is pushed whereby, as shown in FIG. 1C, one copy of the digital image which is currently displayed can be displayed. FIG. 1C shows individual printing in which a digital image, which is currently displayed, is displayed individually. Accordingly, a user can omit the operation of setting the number of print copy in the case when one copy of the digital image is printed individually. Thus, according to the hybrid machine 10, in the case when no default value is set to the number of print copy or '0' is set to the default value for the number of print copy of a digital image not desired during the batch printing, individual printing can be performed with a simple operation.

In this embodiment, the printer unit 30 and the scanner unit 20 are integrated as the hybrid machine 10. However, the printer may be a so-called standalone printer in which the scanner unit is not provided and capable of printing digital images individually, without being controlled by a personal computer or the like.

In this embodiment, the print controlling device and the printer unit 30 are integrated. However, the print controlling device and the printer unit 30 may be separate components. For example, the print controlling device may be configured by a personal computer, and a printer as the printer unit 30 may be connected to the personal computer so that the personal computer may control the printer to perform printing.

Further, the print controlling device may be integrated with a digital camera capable of capturing an image an object to create a digital image. For example, generally, a DPOF (Digital Print Order Format) file can generally be created in a digital camera. DPOF (Digital Print Order Format) is standard format for recording the number of print copy and various print settings in units of digital images. In this connection, if a DPOF file along with digital images is stored in the removable memory, and the removable memory is removed and set in a DPOF-compliant printer, the digital images will be printed according to the number of print copy and various print settings recorded in the DPOF file without performing print operation at the printer. If the print controlling device is provided integrally with a digital camera, individual printing can be set with simple operation when the number of print copy is set in the digital camera in order to create a DPOF file.

Further, so-called direct printing which prints digital images by a digital camera and a standalone printer which are directly connected with each other is known. In this case, the number of print copy of the digital images can be set in the digital camera. When the print controlling device is provided integrally with a digital camera, individual printing can be performed with a simple operation during direct printing.

What is claimed is:

1. A method of controlling printing of at least one of a plurality of digital images, comprising:
    selecting either a first mode in which at least one print copy of at least one of the digital images is printed, or a second mode in which at least one and an identical number of print copies are printed for every one of the digital images, the identical number being user-selectable in the second mode,
    wherein, in a case where the first mode is selected, the method further comprises:
    displaying, in a display, zero or no numeric value as a value indicative of a number of print copies to be printed;
    judging whether a first instruction for designating a number of print copies to be printed for at least one of the digital images is received under a state where the first mode is selected;
    displaying an identifier associated with one of the digital images in the display;
    receiving a second instruction for executing the printing while the identifier associated with the one of the digital images is displayed in the display;
    printing a single print copy of the digital image whose identifier is displayed in the display, even though the zero or no numeric value is displayed in the display, in a case where the second instruction is received and the first instruction is not received; and
    printing at least one and the designated number of print copies for the at least one of the digital images for which a number of print copies to be printed has been designated in the first instruction in a case where the second instruction is received after the first instruction is received;
    wherein, in the case where the second instruction is received after the first instruction is received in the first mode, the one of the digital images whose identifier is displayed in the display is not printed in a case where the number of print copies designated by the first instruction for the one of the digital images is zero or no numeric value, and the designated number of print copies for the one of the digital images whose identifier is displayed in the display is printed in a case where the number of print copies designated by the first instruction for the one of the digital images is one or more, and
    wherein the identifier is a downsized image of an associated one of the digital images.

2. The method as set forth in claim 1, further comprising:
    displaying the designated number of print copies together with the identifier in the case where the first instruction is received.

3. The method as set forth in claim 1, further comprising:
    acquiring the identifier from a storage medium in which data of the digital images is stored.

4. The method as set forth in claim 3, wherein:
    the storage medium is a removable memory.

5. The method as set forth in claim 1, wherein, in a case where the second mode is selected, the method further comprises:
    judging whether a third instruction for designating a number of print copies is received;
    printing a single print copy for every one of the plurality of digital images when a fourth instruction for executing the printing is received and the third instruction is not received; and
    printing the designated number of print copies for every one of the plurality of digital images when the fourth instruction is received after the third instruction is received.

6. The method as set forth in claim 1, wherein, in the case where the first mode is selected,
    the identifier displayed in the display is user-selectable.

7. The method as set forth in claim 1, wherein, in the case where the first mode is selected, at least one of the digital images is printed even though zero is displayed in the display, in the case where the second instruction is received under a condition that the first instruction is not received.

8. The method as set forth in claim 1, wherein zero is set as a default value for the number of print copies of every one of the plurality of digital images.

9. A device for controlling printing of at least one of a plurality of digital images, which is incorporated in an apparatus provided with a display adapted to display at least one of the digital images, the device comprising:

a first judge, operable to judge which one of a first mode and a second mode is selected, the first mode being a mode in which at least one print copy of at least one of the digital images is printed, and the second mode being a mode in which at least one and an identical number of print copies are printed for every one of the digital images, the identical number being user-selectable in the second mode;

a display controller, operable to cause the display to display zero or no numeric value as a value indicative of a number of print copies to be printed;

a first instruction receiver, adapted to receive a first instruction for designating a number of print copies to be printed for at least one of the digital images;

a display, displaying an identifier associated with one of the digital images;

a second instruction receiver, adapted to receive a second instruction for executing the printing while the identifier associated with the one of the digital images is displayed in the display;

a second judge, operable to judge whether the first instruction receiver receives the first instruction under a state where the first mode is selected; and a controller, in a case where the first mode is selected, operable to:

print a single print copy of the digital image whose identifier is displayed in the display even though the zero or no numeric value is displayed in the display, in a case where the second instruction receiver receives the second instruction and the first instruction receiver receives no instruction; and print at least one and the designated number of print copies for the at least one of the digital images for which a number of print copies to be printed has been designated in the first instruction, in a case where the second instruction receiver receives the second instruction after the first instruction receiver receives the first instruction;

wherein, in the case where the second instruction is received after the first instruction is received, the one of the digital images whose identifier is displayed in the display is not printed in a case where the number of print copies designated by the first instruction for the one of the digital images is zero or no numeric value, and the designated number of print copies for the one of the digital images whose identifier is displayed in the display is printed in a case where the number of print copies designated by the first instruction for the one of the digital images is one or more, and wherein the identifier is a downsized image of an associated one of the digital images.

10. A printer, comprising:

a printing unit, operable to print information on a printing medium;

a display, adapted to display at least one digital image; and the device as set forth in claim 9, wherein:

the controller is operable to cause the printing unit to print the at least one of the digital images on the printing medium.

11. A digital camera, adapted to be communicatively connected to a printer provided with a printing unit operable to print information on a printing medium, the digital camera comprising:

an image capturer, adapted to capture an image of an object and operable to generate a digital image;

a display, adapted to display at least one digital image; and the device as set forth in claim 9, wherein:

the controller is operable to cause the printing unit to print the at least one of the digital images on the printing medium.

12. The device as set forth in claim 9, wherein:

the controller, in a case where the second mode is selected, is operable to:

print a single print copy for every one of the plurality of digital images when a third instruction receiver receives a third instruction for executing the printing, if the third instruction is received and the first instruction is not received; and print the designated number of print copies for every one of the plurality of digital images when the third instruction receiver receives the third instruction after the first instruction receiver receives the first instruction.

* * * * *